United States Patent [19]
Rennerfelt

[11] Patent Number: 5,704,865
[45] Date of Patent: Jan. 6, 1998

[54] ECCENTRIC GEAR AND PROCESS FOR MAKING SUCH A GEAR

[75] Inventor: Gustav Rennerfelt, Lidingo, Sweden

[73] Assignee: Scandrive I Hallstahammar AB, Kolback, Sweden

[21] Appl. No.: 602,832

[22] PCT Filed: Sep. 2, 1994

[86] PCT No.: PCT/SE94/00810
§ 371 Date: Feb. 27, 1996
§ 102(e) Date: Feb. 27, 1996

[87] PCT Pub. No.: WO95/07420
PCT Pub. Date: Mar. 16, 1995

[30] Foreign Application Priority Data
Sep. 8, 1993 [SE] Sweden .................. 9302907

[51] Int. Cl.⁶ .................................. F16H 1/32
[52] U.S. Cl. .................. 475/180; 475/162; 475/904; 74/462
[58] Field of Search .................. 475/180, 162, 475/176, 178, 904; 74/462

[56] References Cited

U.S. PATENT DOCUMENTS

| | | | |
|---|---|---|---|
| 4,041,808 | 8/1977 | Fickelscher | 475/180 X |
| 4,526,064 | 7/1985 | Carden et al. | 475/904 X |
| 4,667,539 | 5/1987 | Fickelscher | 475/176 |
| 4,679,465 | 7/1987 | Goto et al. | 475/904 X |
| 4,702,126 | 10/1987 | Nakamura | 475/180 X |
| 5,030,184 | 7/1991 | Rennerfelt | 475/162 |
| 5,055,093 | 10/1991 | Denker | 475/176 X |
| 5,222,922 | 6/1993 | Takahashi et al. | 475/178 |
| 5,429,558 | 7/1995 | Lagarde | 74/462 X |
| 5,537,889 | 7/1996 | Shigeura et al. | 74/462 X |

FOREIGN PATENT DOCUMENTS

93/06999 4/1993 WIPO .

*Primary Examiner*—Charles A. Marmor
*Assistant Examiner*—Peter T. Kwon
*Attorney, Agent, or Firm*—Young & Thompson

[57] ABSTRACT

An eccentric gear comprises first and second gear rings (7,10) of which the one (7) has internal, straight cogs and the other (10) a smaller number of external cogs. At least one gear ring has a conical form with a large end (A—A) and a small end (B—B), the other gear ring (10) having a smaller pitch diameter than the first one (7) and being eccentrically mounted in bearings relative to the first one. Axes of symmetry (24,25) of the respective gear rings form an angle ($\alpha$) with each other. The contact points or the locations of engagement between the flanks of the cogs in the one gear ring and the opposed flanks of the cogs in the other gear ring are substantially located along a helical line which extends in axial direction between said large and small ends.

14 Claims, 6 Drawing Sheets

ECCENTRIC GEAR AND PROCESS FOR MAKING SUCH A GEAR

TECHNICAL FIELD OF THE INVENTION

The present invention relates to an eccentric gear of the type that includes first and second cooperating gear rings. One of the gear rings has a certain number of internal straight cogs and the other has a smaller number of external, equally straight cogs. At least one gear ring has a conical form with a large end and a small end, while the second gear ring has a smaller pitch diameter than the first one and is eccentrically mounted in bearings relative to the first one in order to roll off upon the internal cogs of the latter, and with the axes of symmetry of each respective gear ring forming an angle with each other.

An example of the field of use for eccentric gears of the type described relates to their use as distribution rollers in printing machines—more particularly as distribution rollers with a built-in mechanism for realizing an axial, reciprocal motion of the roller at the same time as it rotates with high speed. Another field of use is where they are used are reduction gears where silent running is important. For medical applications, controlling of curtains, awnings, electrical domestic appliances and the like, planetary gears of plastic material are often used. These often have a high noise level, which is inconvenient.

2. Prior Art

In WO-A-9306999, a device is disclosed according to which a slightly shaped conical gear ring rolls against a cylindrical internal gear ring. The conical eccentric gear ring, which is eccentrically mounted in bearings, has one or more fewer cogs than the cylindrical gear ring and in this way a slow change of the angular interposition between the gear rings is attained. This change of angular interposition is transferred to a cam element and a cam roll which thus effects an axial displacement of a distribution roller in which the mechanism is located.

In U.S. Pat. No. 5,030,184, a gear correction method is described which makes it possible to produce an eccentric gear in which the two gear rings have cogs numbers that differ from each other by one or several cogs.

According to the constructional arrangement of the cogs in the gear of WO-A-9306999, a cross-section is laid through the slightly conical, eccentrically arranged gear ring in a position around the middle of the axial extension of the gear ring. In this position, the cogs are intercorrected by the calculation and correction process described in said U.S. Pat. No. 5,030,184. In this load, the conical, external gear ring operates in a manner so that its abutment against the cylindrical, internal gear ring becomes optimal. Thus, the resulting cog contact is optimal only in a section at a point of half the axial extension of the conical, eccentric gear ring. In theory, in an unloaded state (of the gear) only two pairs of cogs are in contact in this axial section, i.e., one pair in each loading direction. At the time of loading of the gear, several pairs of cogs will come in contact with each other due to cog distorsion. Normally, 3 to 5 pairs of cogs will be loaded in each loading direction. In each axial section, being other than the optimal middle section of the conical gear ring, a cog abutment is obtained that differs from the possible optimal one in this section.

Objects and Characteristics of the Invention

In order to obtain optimal load transfer of the cog pairs, which are in contact with each other in the unloaded state of the gear, it is desirable that the cog contact in each axial cross-section be optimal. This is achieved by turning the blank of the slightly conical gear ring with a certain cone point angle determined according to the method as described hereinafter. From this blank, the conical gear ring is manufactured with a certain cog cone angle, determined by the method as described hereinafter.

According to the present invention, an eccentric gear is obtained whose straight cogs in the conical gear ring have a helical line of contact against the internal, straight cogs of the cylindrical gear ring. This helical line of contact makes the gear run smoothly and silently and contributes to the gear being capable of transferring higher torques. Since the load is distributed over many cogs and along the whole axial length of the gear ring, the surface pressure is thus relatively low, which enhances the possibility of maintaining a good lubricating film and, thus, a good wear strength of the gear.

DESCRIPTION OF THE DRAWINGS

An embodiment of the invention will be described more in detail below, in connection with the appended drawings, in which.

Further Elucidation of Prior Art

Figure 1:
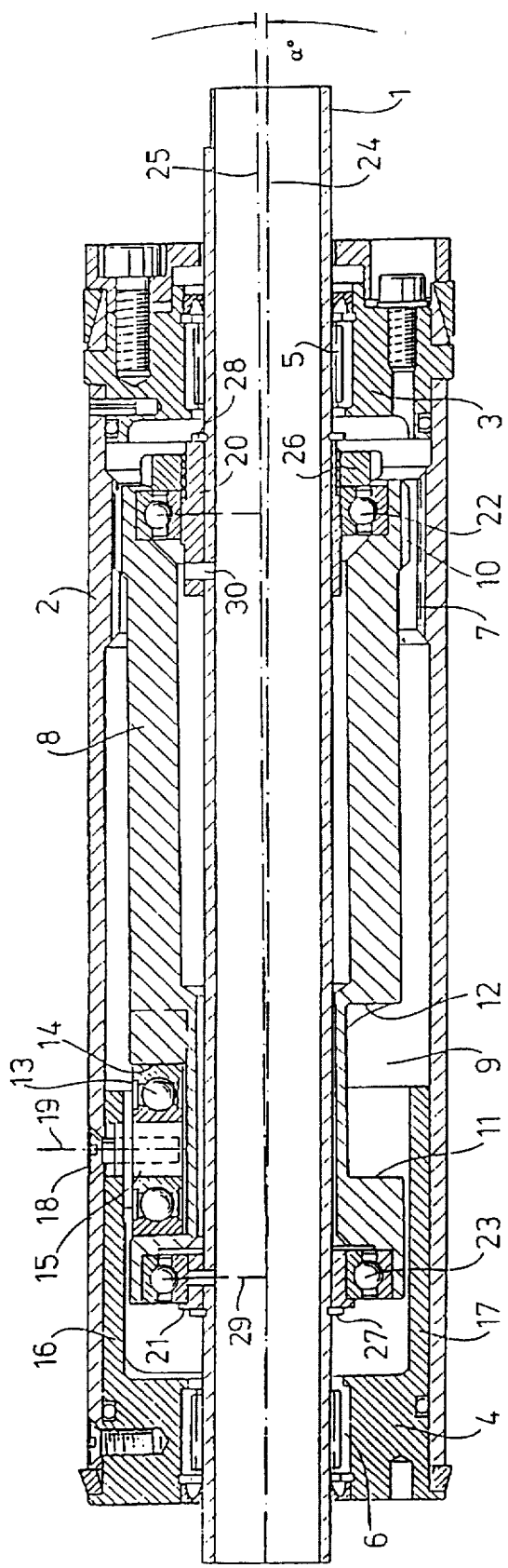
FIG. 1 is a longitudinal section of a known eccentric gear arrangement in a distribution roller.

FIG. 1 shows an eccentric gear unit intended to be inserted into a distribution roller of a printing press in order to provide reciprocal motion. The unit shown is of the type described in WO-A-9306999. The unit is inserted and fixed at one end of the distribution roller, and includes a pipe with a rubber-clad exterior. The axle 1 of the unit is fastened on the stand of the printing press. Thus, the unit constitutes one of the bearings for the distribution roller. The distribution roller is driven with a high rotational speed by co-rotating against another roller in the printing press. Besides being a bearing unit, the purpose of the unit is to give a distribution roller an axial reciprocal, slow motion movement. Usually, the motion is sinusoidal with an amplitude within the range +/−5 to 20 mm. The rotational speed of the distribution roller may amount to 1,000 to 2,000 rev. per minute and the frequency of the axial motion to 0,5 to 2 Hz.

In order to obtain the sinusoidal axial motion, the unit is constructed in the following manner:

On a stationary axle 1, a cylinder 2 is rotatably mounted by gables 3,4 and needle bearings 5,6. A cam cog element 8 is obliquely mounted in bearings on the stationary axle 1 and has a conical gear ring 10 with external cogs which roll off against an internal cylindrical gear ring 7 on the cylinder 2.

The other end of the cam cog element is provided with an axially directed ridge groove 9, in which a cam roll 14 rolls. The cam roll is mounted in bearings 13 on an axle 15 which is fastened at the cylinder 2.

The conical gear ring 10 and the cylindrical gear ring 7 form parts of the eccentric gear. The cogs in these rings have been corrected in accordance with the above described method. Thus, with the construction of the cogs in the known gear, a cog cross-section is chosen which is located at about the middle of the axial length of the conical gear ring 10. The cross-section of the conical gear ring 10 in the position at the middle of the axial extension, has imparted to it, an optimal contact in relation with the internal cogs of the cylindrical gear ring 7 by a calculation and correction procedure according to FIG. 2 and 3. This cog correction procedure is described in U.S. Pat. No. 5,030,184.

Figure 2:
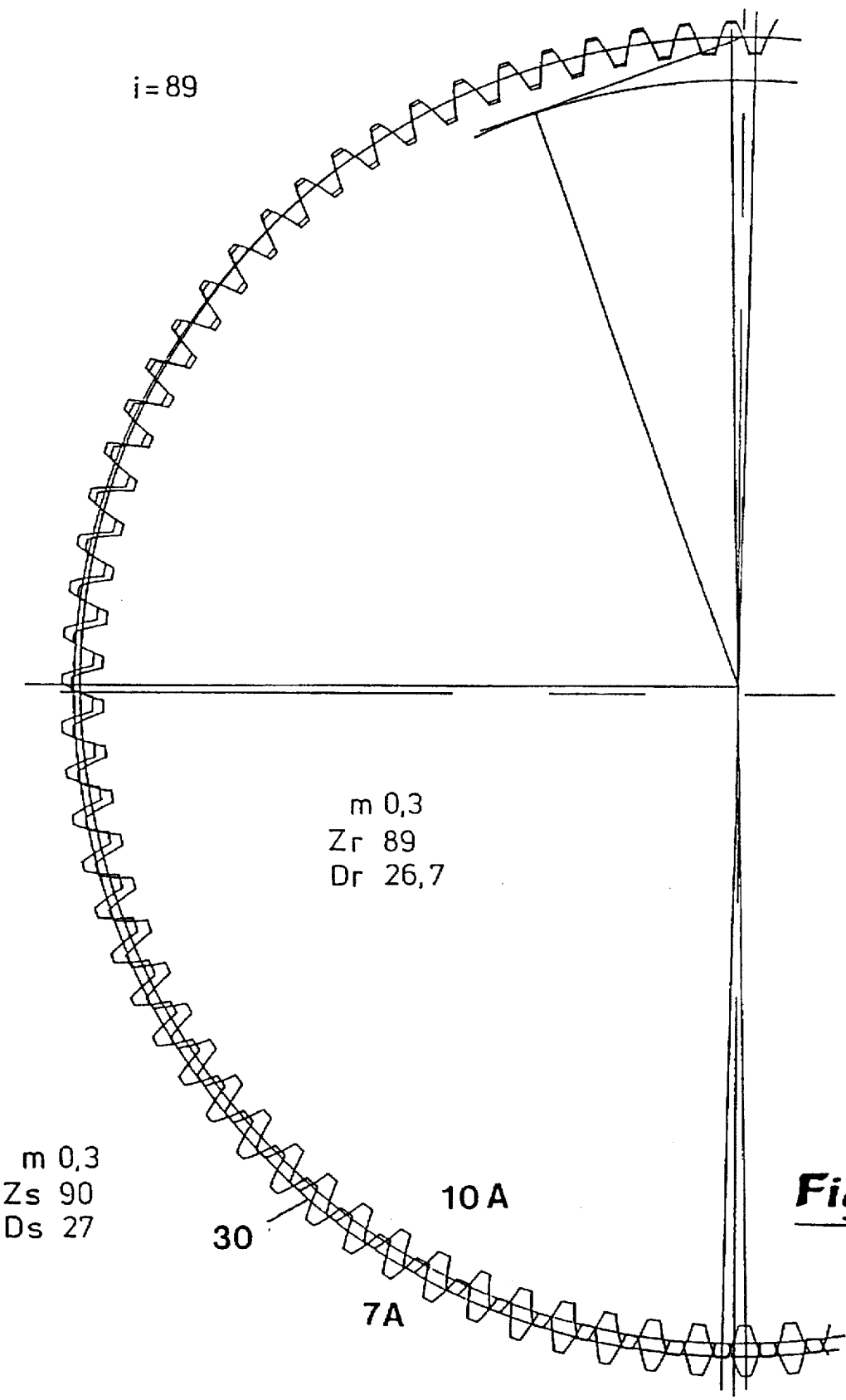
FIG. 2 is a partial cross-section showing the engagement between a gear ring with internal cogs and a gear ring with external cogs, before contour displacement and shortening.

For input-data for the cog correction procedure, the desired gear relation, the approximate pitch diameter Ds and the desired value m of the real module are used. From these values, a first calculation for a first approximate value of the pitch diameter of the gear ring 10A is made and as well a first value of the eccentricity $e_o$, which is about the same as half the pitch diameter Ds of the gear ring 10A reduced by half the pitch diameter of the gear ring 7A is obtained. Also, the cog numbers $Z_{10A}$ and $Z_{7A}$ are calculated for the two gear rings 10A and 7A. If the cog number does not become an integral number, the pitch diameter is altered and the procedure is repeated. When the cog number is an integral number, the cogs of the gear rings are drawn, preferrably by a CAD technique. The result, shown in FIG. 2, illustrates the cog engagement between a gear ring 10A with 89 external cogs and a gear ring 7A with 90 internal cogs. The cogs on gear rings 7A and 10A are constructed by a conventional cog machining process. As will be seen in FIG. 2, a cog interference is present between 06.00 hours and 09.00 hours. In these areas, the flanks of the cogs collide. A gear produced with such gear rings would become blocked.

In order to avoid such cog interference, the cogs on gear rings 7A and 10A are contour-displaced, so that a new value of eccentricity is obtained according to the following equation:

$$e_1 = e_0 + f(m \cdot x_1, m \cdot x_2)$$

wherein m is the cog module, $x_1$ and $x_2$ contour displacement coefficients and where f ( ... ) is a function of $m \cdot x_1$ and $m \cdot x_2$.

Figure 3:
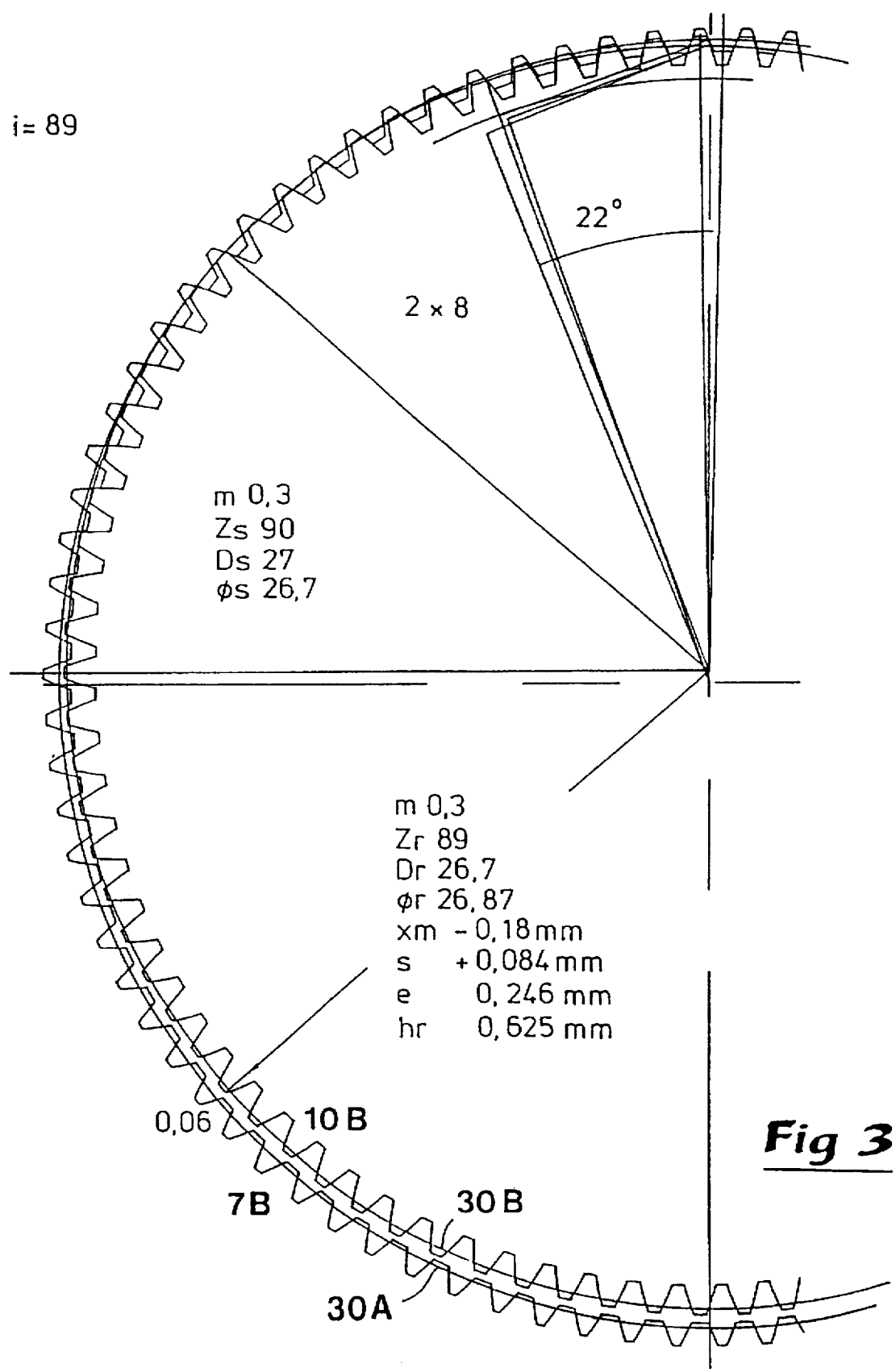
FIG. 3 is a section analogous to FIG. 2 after contour displacement and shortening of the internally cogged ring.

The cogs of the two gear rings are drawn again with the cogs corrected by contour displacement. By adjustment of the eccentricity to the determined contour displacement, an optimal contact is attained between the flanks of the cog pairs which (in the unloaded state) are in contact with each other. A certain correction of one of the pressing angles of the gear rings may also be appropriate in order to obtain the desired optimal pressing between the cog flanks. Thereafter, one or both gear rings are shortened so that the cogs pass each other after having been in contact. The degree of shortening should be such that the manufacturing tolerances can not lead to a collision of the cog tips. The shortening results in a situation where the contact length in radial direction diminishes and, as a consequence thereof, the surface pressure of the cog engagement increases. Therefore, a compromise must be found between the size or amount of the shortening and the contact length. The result is shown in FIG. 3. $Z_r$ designates the number of cogs (89) on the eccentric gear ring 10B, $Z_s$ the number of cogs (90) on the gear ring 7B, $\phi_r$ the diameter of the circle that the cog tips of the eccentric gear ring 10B describe and $\phi_s$ the diameter of the curve that the cog tips of gear ring 7B describe. The contour displacement does not alter the pitch circle designated by 30B for the gear ring 10B, but indicates implies that at its manufacturing stage, the tool is displaced towards the centre of the blank for the gear ring 10B by the value of the contour displacement. The magnitude of the contour displacement expressed in mm is -xm, where the minus sign tells that the tool is displaced towards the centre of the blank. "Shortening" means that the height of the cog tips is reduced by altering the blank diameter of the gear ring. As may be seen in FIG. 3, the pitch circles 30A,30B of the two gear rings intersect at about 10.30 hours and in an area between about 10.30 hours and 01.30 hours pitch circle 30B is situated outside pitch circle 30A.

DETAILED DESCRIPTION OF THE PRESENT INVENTION

Figure 4:
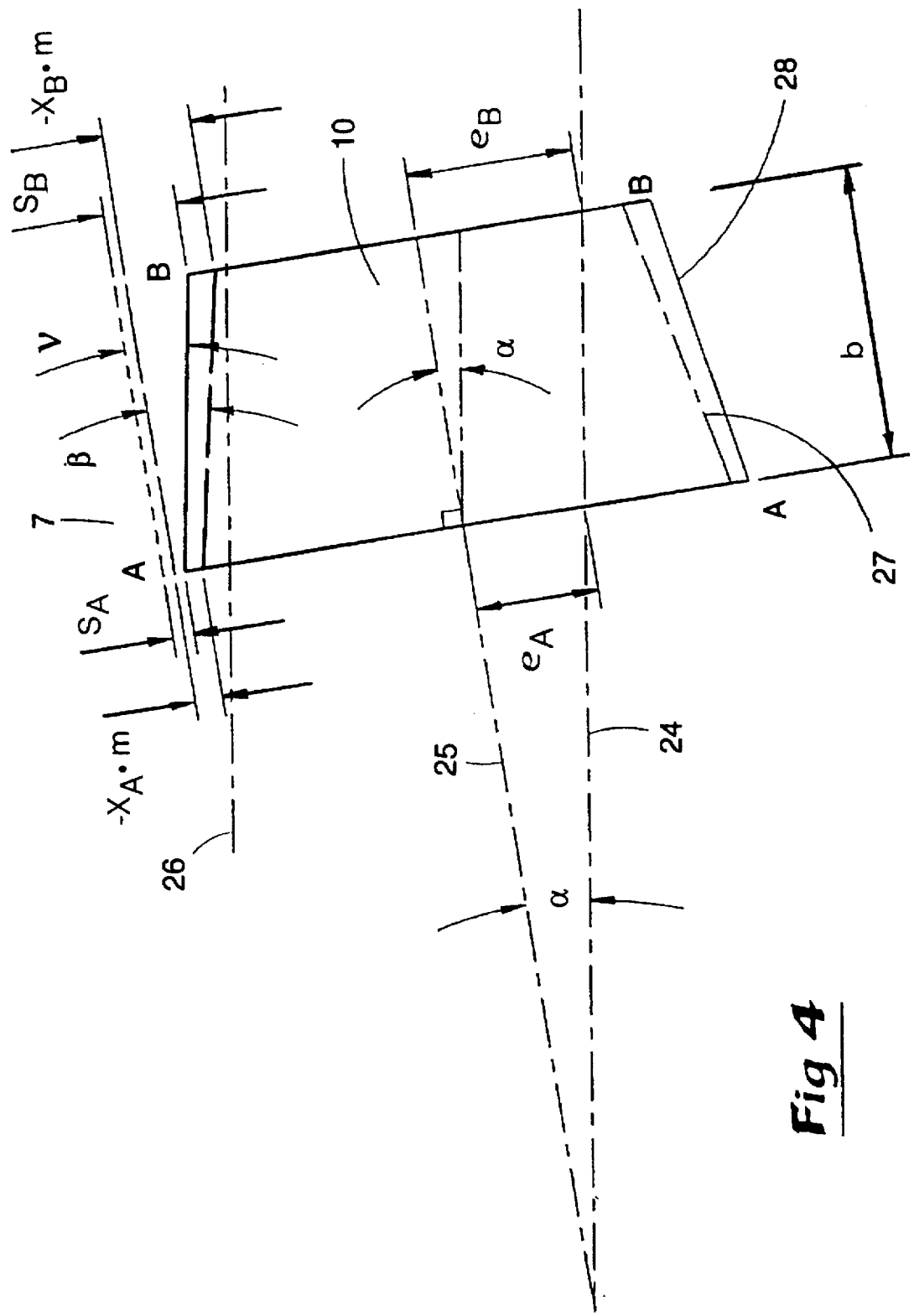
FIG. 4 is an enlarged and simplified longitudinal section showing angles, rotation axes and cog engagements.

FIG. 4 schematically shows a longitudinal section of the gear rings 7,10 according to FIG. 1, the angles being somewhat exaggerated for the sake of clarity. The symmetry axis 25 of the eccentric gear ring forms an angle α with the symmetry axis 24 of the cylindrical, internal gear ring. The axial section A—A at the large end of the conical eccentric gear ring engages with the pitch diameter 26 of the cylindrical internal gear ring.

An optimal cog pressing is brought about in this axial section A—A by the method as described above and in U.S. Pat. No. 5,030,184. Thus a first value $e_A$ of eccentricity is obtained. Then the geometrical eccentricity $e_B$ of the axial section B—B may be determined according to the following equation:

$$e_B = e_A + b \cdot \tan \alpha$$

wherein α is the desired cone angle and b is the cog width.

The optimal cog solution for the axial section B—B is now calculated in the same way as for cross-section A—A. However, for cross-section B—B, one starts off from a given, fixed eccentricity $e_B$ (and any possible press angle correction) and makes contour displacements and shortening on the gear rings in order to obtain optimal abutment.

Figure 5:
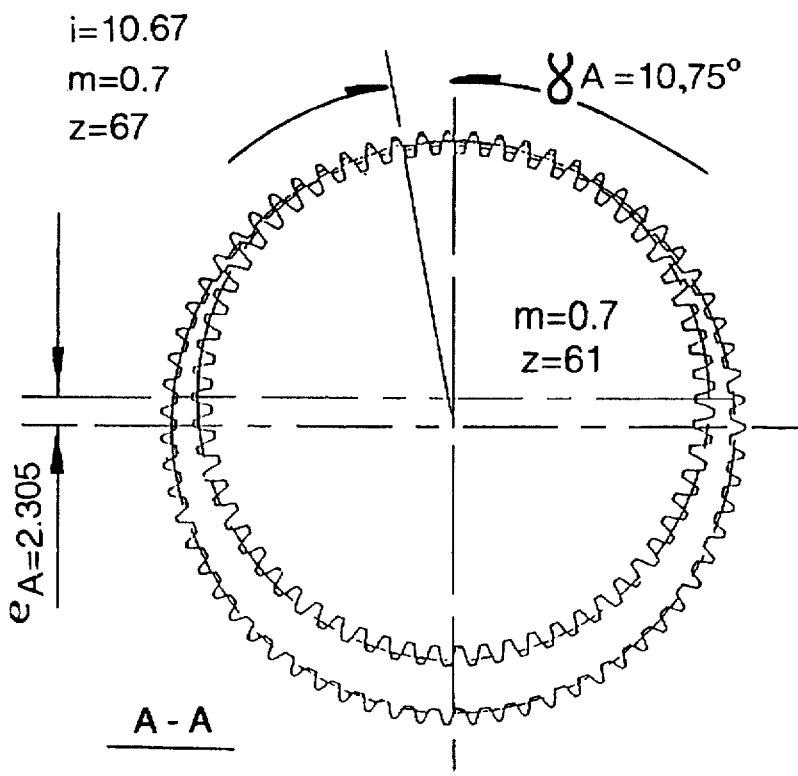
FIG. 5 is the cross-section along A—A in FIG. 4.
Figure 6:
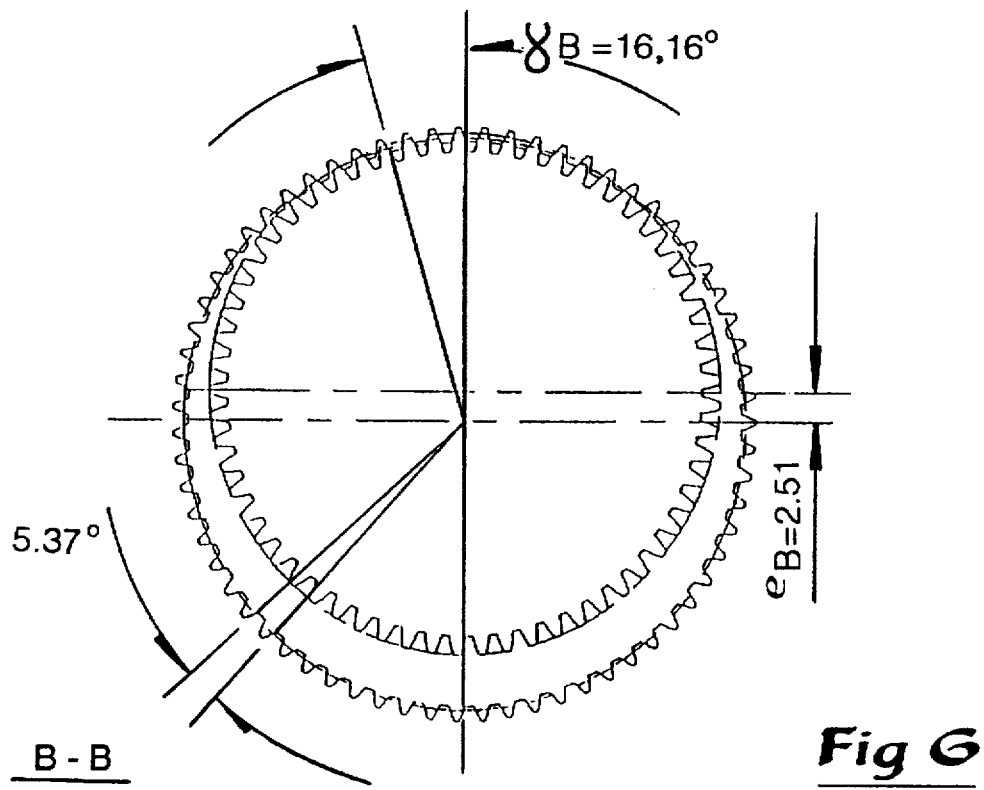
FIG. 6 is the cross-section along B—B in FIG. 5.

FIGS. 5 and 6 show a cog solution where the gear i=-10,167,module m=0,7 and the difference in the number of cogs=67-61=6. The effective cog width (=the distance between the axial cross-sections A—A and B—B) is 8 mm.

At the optimal solution of the large end (the axial cross-section A—A), one determines for an unloaded gear that each of the two cog pairs which are in engagement form an angle $\gamma_A=10.75°$ to the eccenter direction. In this case the eccentricity is $e_A=2.305$ mm.

At the optimal solution of the small end (the axial cross-section B—B), one determines for an unloaded gear that each of the two cog pairs which are in engagement forms an angle $\gamma_B=16.16°$ to the eccentric direction. In this case the eccentricity is $e_B=2.51$ mm.

From FIGS. 5 and 6, it might be seen that in an axial cross-section which is displaced from section A—A to section B—B, the angular positions of the contact points in relation to the eccentric direction will be continually changed from 10.75° to 16.16°. It will also be seen that the magnitude of the angular variation in this example roughly corresponds to one cog partition (5.37°). At higher gearings, i.e. at smaller differences in numbers of cogs, this angular variation will be larger. Thus, with this cog optimization method, a helically formed contact of cogs has been attained, which is quite favourable for cog strength and silent gear running. This helical contact line may be compared to the helical contact line that is obtained when cutting the cogs obliquely. By the described method, a straight conical cog obtains a helical contact line that gives a smooth run and enables the transfer of high torque. Hence, this type of cog can not be produced with the cone angle $2\alpha$ ($\alpha$ is the angle which the rotation axis of the cog has in relation to the rotation axis of the internal gear ring) but rather will be produced with the cone angle $2\beta$, obtained from the equation $$\beta = arctan\ (g/b)$$

wherein g is the difference in contour displacement ($-x_B \cdot m$) $-(-x_A \cdot m)$ in the cross-sections A—A and B—B and b is the perpendicular distance between the cross-sections. The blank for the conical gear ring will be turned conically with the angle 2v which is obtained from the equation $$v = arctan\ ((S_B - S_A)/b)$$

wherein $S_A$ and $S_B$ are the shortenings in the axial cross-sections A—A and B—B, respectively.

In summary, in order to obtain optimal cog contact in the gear, the conical gear ring, whose axis of rotation forms the angle $\alpha$ with the axis of rotation of the cylindrical internal gear ring, will be manufactured with the conical cog angle $2\beta$ and the cone point angle 2v.

The above described embodiment of the invention relates to a conical eccentric gear for a distribution roller unit where the eccentric axle is stationary and the internal gear ring rotates. As previously noted, the invention may also be used in applications where the internal gear ring is stationary and the eccentric gear ring is freely mounted in bearings on the input of a fast-rotating axle. In connection with such an embodiment, by a suitably selected combination of materials, e.g., an eccentric gear ring of plastic material in engagement with an eccentric gear ring of nodular iron, a reduction of rotational speed may be obtained which has very smooth running characteristics and also a silent running due to the helical line of contact.

Figure 7:
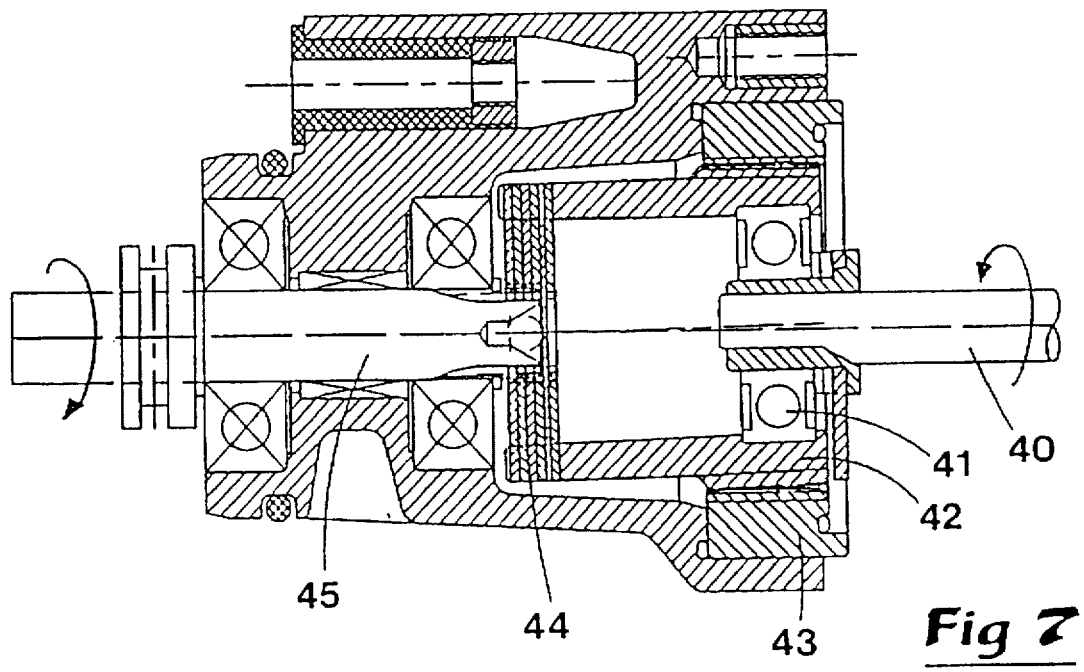
FIG. 7 is a longitudinal section through a reduction gear in which an eccentric cog-wheel, made of plastic material, obtains an optimal silent running.

FIG. 7 shows a longitudinal section of an eccentric gear intended for a medical application where silent running is a primary requirement. One end of a conical cog-wheel 42 is freely mounted eccentrically in bearings on a fast-rotating input axle 40 by a ball bearing 41. Cog-wheel 42 rolls on a stationary, internal gear ring 43. The other end of cog-wheel 42 is connected via an angle-uptake coupling (arc-tooth coupling) 44 with the output axle 45 of the gear. In this application the reduction is 50:1. It should be noted that the output axle has a reduced rotation opposed to the direction of rotation of the input axle.

Figure 8:
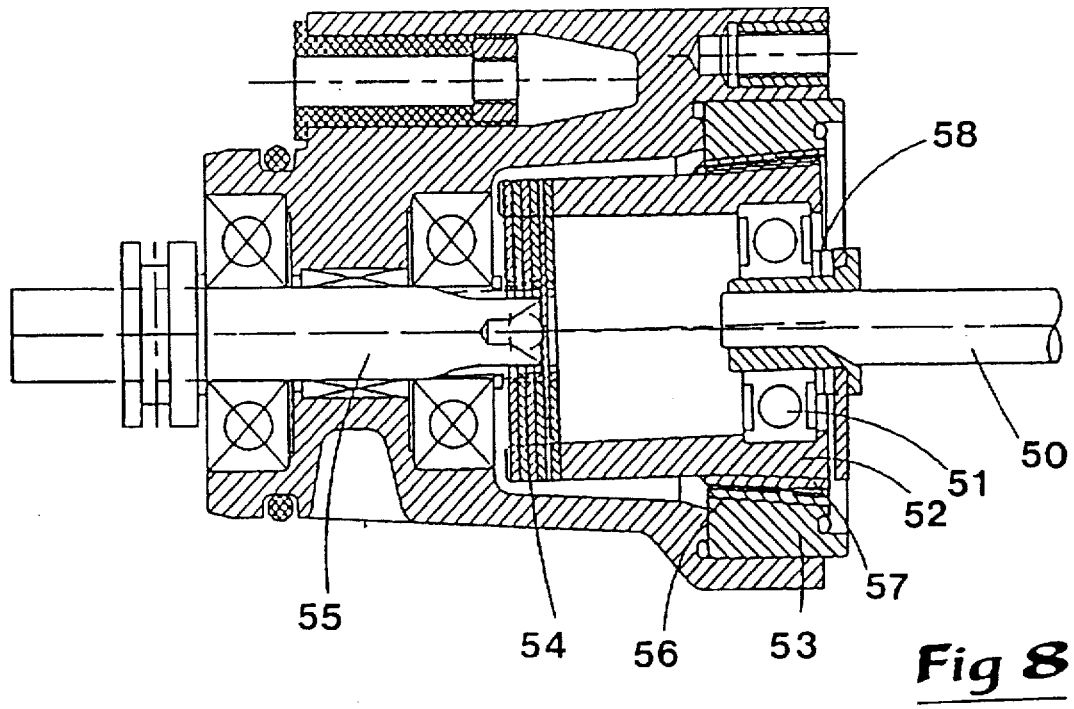
FIG. 8 is a longitudinal section of a reduction gear according to FIG. 7, in which the internal gear ring is conical in order to eliminate play.

In order to eliminate play in the cog engagement caused by manufacturing tolerances or wear, the internal gear ring 56 (see FIG. 8) may be of a conical configuration and may be optimized with regard to abutment with the eccentric cog-wheel 52 according to the above described method. Thus, the gear ring 57 of the cog-wheel is cylindrical or conical "in an opposite direction", i.e., its cone point is directed to the left in FIG. 8. Automatic elimination of play is obtained by a cup spring 58 operating between input axle 50 and ball bearing 51. The disadvantage of this cog configuration is that the internal cog is relatively expensive to manufacture. However, by series fabrication it is possible to produce such cog-wheels more economically, e.g., by a powder sintering technique or plastic moulding.

In the above described application as a gear in a distribution roller unit, the internal cogs can also be used as splines since the reciprocal motion of the eccentric gear ring will let it move axially along the internal gear ring, which thus serve as splines. in other applications in which it functions only as a reduction gear, and where no axial displacement between the cog-wheels takes place, the internal gear ring may be conical and the external eccentric gear ring may be cylindrical. Alternatively, both gear rings may be conical.

The described eccentric gear may also be used "backwardly", i.e., for increasing the rotational speed.

This type of gear may also be used in a differential configuration, i.e., both the input shaft and either the internal gear ring or the shaft previously designated as the output shaft, may be driven in such a way that the output rotational speed of a third shaft becomes the sum of the input rotational speeds of the two other shafts. Finally it should be pointed out that the cogs of the present invention preferably are of the involute type and that the gear rings as well as the cogs are made of metal, e.g. steel.

I claim:

1. Eccentric gear comprising first and second, cooperating gear rings (7,10) of which one (7) has a certain number of internal, straight cogs and the other (10) has a smaller number of external, equally straight cogs, and of which at least one has a conical form with a large end (A—A) and a small end (B—B), the second gear ring (10) having a smaller pitch diameter than the first one (7) and being eccentrically mounted in bearings relative to the first in order to roll off upon the internal cogs of the latter, and the axes of symmetry (24,25) of each respective gear ring forming an angle ($\alpha$) with each other, characterized in that the locations of engagement between the flanks of the cogs in the one gear ring and the opposed flanks of the cogs in the other gear ring are substantially located along a helical line that extends in axial direction between said large and small ends, and the angular positional values of the locations of engagement—seen in infinitesimally thick axial sections along the longitudinal extension of the cogs—increases from a first value ($\gamma_A$) at the large end (A—A) to a second, larger value ($\gamma_B$) at the small end (B—B).

2. Eccentric gear according to claim 1, characterized in that the first gear ring (7), which has internal cogs, has a cylindrical form and that the other gear ring (10), which has external cogs, has the conical form.

3. Eccentric gear according to claim 1, characterized in that the cogs in the two gear rings are contour-displaced with different values $-m.x_A$ and $-m.x_B$, respectively, at separate axial cross-sections along the same gear ring, wherein m is the real module and $x_A$ and $x_B$ the contour displacement coefficient.

4. Eccentric gear according to claim 3, characterized in that each conical gear ring has a cog cone angle $2\beta$ which is determined by the equation $$\beta = arctan[(m \cdot x_B - m \cdot x_A)/b]$$

wherein $-m \cdot x_A$ and $-m \cdot x_B$ are the contour displacements in two selected axial cross-sections along the gear ring in question and b is the axial distance between these two sections.

5. Eccentric gear according to claim 2, characterized in that the cogs in the two gear rings are contour-displaced with different values $-m.X_A$ and $-m.X_B$, respectively, at separate axial cross-sections along the same gear ring, wherein m is the real module and $X_A$ and $X_B$ the contour displacement coefficient.

6. Eccentric gear according to claim 1, characterized in that the cogs in the two gear rings are contour-displaced with different values $-m \cdot X_A$ and $-m \cdot X_B$, respectively, at separate axial cross-sections along the same gear ring, wherein m is the real module and $X_A$ and $X_B$ the contour displacement coefficient.

7. Eccentric gear according to claim 5, characterized in that each conical gear ring has a cog cone angle $2\beta$ which is determined by the equation $$\beta = arctan[(m \cdot X_B - m \cdot X_A)/b]$$

wherein $-m \cdot X_A$ and $-m \cdot X_B$ are the contour displacements in two selected axial cross-sections along the gear ring in question and b is the axial distance between these two sections.

8. Eccentric gear according to claim 6, characterized in that each conical gear ring has a cog cone angle $2\beta$ which is determined by the equation $$\beta = arctan[(m \cdot X_B - m \cdot X_A)/b]$$

wherein $-m \cdot X_A$ and $-m \cdot X_B$ are the contour displacements in two selected axial cross-sections along the gear ring in question and b is the axial distance between these two sections.

9. Eccentric gear according to claim 1, characterized in that the cogs in the two gear rings are shortened by different values $S_A$ and $S_B$, respectively, at separate axial cross-sections along the same gear ring, wherein $S_A$ and $S_B$, respectively, are the values of effected shortenings.

10. Eccentric gear according to claim 9, characterized in that each conical gear ring has a cone point angle $2v$ which is determined by the equation $$v = arctan[(S_B - S_A)/b]$$

wherein $S_A$ and $S_B$ are the shortenings in two selected axial cross-sections along the gear ring in question and b is the axial distance between these two sections.

11. Eccentric gear according to claim 2, characterized in that the cogs in the two gear rings are shortened by different values $S_A$ and $S_B$, respectively, at separate axial cross-sections along the same gear ring, wherein $S_A$ and $S_B$, respectively, are the values of effected shortenings.

12. Eccentric gear according to claim 1, characterized in that the cogs in the two gear rings are shortened by different values $S_A$ and $S_B$, respectively, at separate axial cross-sections along the same gear ring, wherein $S_A$ and $S_B$, respectively, are the values of effected shortenings.

13. Eccentric gear according to claim 11, characterized in that each conical gear ring has a cone point angle $2v$ which is determined by the equation $$v = arctan[(S_B - S_A)/b]$$

wherein $S_A$ and $S_B$ are he shortenings in two selected axial cross-sections along the gear ring in question and b is the axial distance between these two sections.

14. Eccentric gear according to claim 12, characterized in that each conical gear ring has a cone point angle $2v$ which is determined by the equation $$v = arctan[(S_B - S_A)/b]$$

wherein $S_A$ and $S_B$ are he shortenings in two selected axial cross-sections along the gear ring in question and b is the axial distance between these two sections.

* * * * *